(12) United States Patent
Kasriel et al.

(10) Patent No.: US 7,836,177 B2
(45) Date of Patent: Nov. 16, 2010

(54) NETWORK OBJECT PREDICTIVE PRE-DOWNLOAD DEVICE

(75) Inventors: Stephane Kasriel, Neuilly (FR); Xavier Casanova, San Jose, CA (US); Walter R. Mann, San Francisco, CA (US)

(73) Assignee: Digital River, Inc., Eden Prairie, MN (US)

( * ) Notice: Subject to any disclaimer, the term of this patent is extended or adjusted under 35 U.S.C. 154(b) by 0 days.

(21) Appl. No.: 12/341,746

(22) Filed: Dec. 22, 2008

(65) Prior Publication Data

US 2009/0106381 A1  Apr. 23, 2009

Related U.S. Application Data

(63) Continuation of application No. 11/262,225, filed on Oct. 28, 2005, now Pat. No. 7,548,947, which is a continuation of application No. 09/734,910, filed on Dec. 11, 2000, now Pat. No. 6,981,017, which is a continuation-in-part of application No. 09/436,136, filed on Nov. 9, 1999, now Pat. No. 6,721,780.

(51) Int. Cl.
*G06F 15/173* (2006.01)
(52) U.S. Cl. ...................... 709/224; 709/206
(58) Field of Classification Search ................ 709/203, 709/206, 224
See application file for complete search history.

(56) References Cited

U.S. PATENT DOCUMENTS 5,680,634 A  10/1997  Estes
5,727,129 A  3/1998  Barrett et al.
5,728,129 A  3/1998  Summers (Continued)

FOREIGN PATENT DOCUMENTS

WO  0028433 A2  5/2000

(Continued)

OTHER PUBLICATIONS

Delphion Intellectual Property Network to search. "Weclome to the new world of IP Information, Delphion". 1997-2001 Delphion Inc. <URL:http/www.delphion.com>.

(Continued)

*Primary Examiner*—Frantz B Jean
(74) *Attorney, Agent, or Firm*—North Oaks Patent Agency; Shawn B. Dempster

(57) ABSTRACT

A network object predictive pre-download device operable on a network logically between a web client and a web server on a network is described. The pre-download device includes a prediction engine that intercepts a request from the web client to the web server for a first network object and determines a second network object most probable to be requested in the future from the web server. The pre-download device also includes a cache primer that intercepts a response to the request from the web server and sends a first message to the web client informing the web client of the second network object to be cached by the web client. The cache primer also sends the second network object to the web client such that the second network object is predicatively pre-downloaded to the web client whereby second network object latency is reduced when an actual user request occurs.

17 Claims, 6 Drawing Sheets

U.S. PATENT DOCUMENTS

| | | | |
|---|---|---|---|
| 5,774,660 | A | 6/1998 | Brendel |
| 5,802,292 | A | 9/1998 | Mogul |
| 5,826,258 | A | 10/1998 | Gupta |
| 5,835,712 | A | 11/1998 | DuFresne |
| 5,845,088 | A | 12/1998 | Lewis |
| 5,859,971 | A | 1/1999 | Bittinger |
| 5,870,546 | A | 2/1999 | Kirsch |
| 5,878,223 | A * | 3/1999 | Becker et al. ............... 709/223 |
| 5,878,429 | A | 3/1999 | Morris |
| 5,931,904 | A | 8/1999 | Banga |
| 5,944,790 | A | 8/1999 | Levy |
| 5,978,841 | A | 11/1999 | Berger |
| 5,983,227 | A | 11/1999 | Nazem |
| 5,987,480 | A | 11/1999 | Donohue |
| 6,003,087 | A | 12/1999 | Housel |
| 6,021,426 | A | 2/2000 | Douglis |
| 6,026,413 | A | 2/2000 | Challenger |
| 6,061,715 | A | 5/2000 | Hawes |
| 6,067,565 | A | 5/2000 | Horvitz |
| 6,085,193 | A | 7/2000 | Malkin |
| 6,094,662 | A | 7/2000 | Hawes |
| 6,098,152 | A | 8/2000 | Mounes-Toussi |
| 6,112,242 | A | 8/2000 | Josi |
| 6,128,655 | A | 10/2000 | Fields et al. |
| 6,138,251 | A | 10/2000 | Murphy |
| 6,144,990 | A | 11/2000 | Brandt |
| 6,154,767 | A | 11/2000 | Altschuler |
| 6,178,461 | B1 | 1/2001 | Chan et al. |
| 6,192,382 | B1 | 2/2001 | Lafer et al. |
| 6,216,212 | B1 | 4/2001 | Challenger |
| 6,249,795 | B1 | 6/2001 | Douglis |
| 6,249,844 | B1 | 6/2001 | Schloss et al. |
| 6,256,712 | B1 | 7/2001 | Challenger |
| 6,260,192 | B1 | 7/2001 | Rosin |
| 6,263,352 | B1 | 7/2001 | Cohen |
| 6,314,465 | B1 | 11/2001 | Paul |
| 6,327,628 | B1 | 12/2001 | Anuff |
| 6,343,318 | B1 | 1/2002 | Hawkins |
| 6,374,305 | B1 | 4/2002 | Gupta |
| 6,377,978 | B1 | 4/2002 | Nguyen |
| 6,397,217 | B1 | 5/2002 | Melbin |
| 6,405,252 | B1 | 6/2002 | Gupta et al. |
| 6,430,624 | B1 | 8/2002 | Jamtgaard et al. |
| 6,453,319 | B1 | 9/2002 | Mattis et al. |
| 6,457,103 | B1 | 9/2002 | Challenger et al. |
| 6,466,937 | B1 | 10/2002 | Fascenda |
| 6,466,970 | B1 | 10/2002 | Lee et al. |
| 6,523,063 | B1 | 2/2003 | Miller et al. |
| 6,553,413 | B1 | 4/2003 | Lewin et al. |
| 6,560,604 | B1 | 5/2003 | Fascenda |
| 6,605,120 | B1 | 8/2003 | Fields et al. |
| 6,606,525 | B1 | 8/2003 | Muthuswamy et al. |
| 6,623,529 | B1 | 9/2003 | Lakritz |
| 6,629,138 | B1 * | 9/2003 | Lambert et al. ............. 709/224 |
| 6,697,844 | B1 | 2/2004 | Chan |
| 6,704,024 | B2 | 3/2004 | Robotham |
| 6,728,785 | B1 | 4/2004 | Jungck |
| 6,760,746 | B1 | 7/2004 | Schneider |
| 6,792,475 | B1 | 9/2004 | Arcuri et al. |
| 6,826,553 | B1 | 11/2004 | DaCosta et al. |
| 6,826,626 | B1 | 11/2004 | McManus |
| 6,857,012 | B2 | 2/2005 | Sim et al. |
| 6,868,453 | B1 | 3/2005 | Watanabe |
| 6,873,877 | B1 | 3/2005 | Tobias et al. |
| 6,879,998 | B1 | 4/2005 | Raciborski et al. |
| 6,910,073 | B2 | 6/2005 | Banga et al. |
| 6,912,591 | B2 | 6/2005 | Lash |
| 6,944,817 | B1 | 9/2005 | Danneels |
| 7,055,094 | B2 | 5/2006 | Imielinski et al. |
| 7,058,700 | B1 | 6/2006 | Casalaina |
| 7,072,849 | B1 * | 7/2006 | Filepp et al. ............. 705/14.66 |
| 7,096,418 | B1 | 8/2006 | Singhal et al. |
| 7,194,682 | B2 | 3/2007 | Warrington |
| 7,483,955 | B2 | 1/2009 | Gupta et al. |
| 7,502,858 | B2 | 3/2009 | Gupta et al. |
| 2001/0037400 | A1 | 11/2001 | Raz |
| 2001/0056460 | A1 | 12/2001 | Sahota et al. |
| 2002/0004813 | A1 | 1/2002 | Agrawal et al. |
| 2002/0032677 | A1 | 3/2002 | Morgenthaler et al. |
| 2002/0056010 | A1 | 5/2002 | Lincoln et al. |
| 2002/0062384 | A1 | 5/2002 | Tso |
| 2003/0009563 | A1 | 1/2003 | Douglis |
| 2003/0120752 | A1 | 6/2003 | Corcoran |
| 2003/0154261 | A1 | 8/2003 | Doyle et al. |
| 2004/0172458 | A1 * | 9/2004 | Pitts ........................... 709/213 |
| 2006/0168348 | A1 | 7/2006 | Casalaina |

FOREIGN PATENT DOCUMENTS

WO              0028433    A3      5/2000

OTHER PUBLICATIONS

"Scalable Web Clusters with Static and Dynamic Contents", Casalicchio E. Colajanni, M., IEEE International Proceedings on Conference Cluster Computing, pp. 170-177, Nov. 2000.

Intelligent Prefetch in WWW Using Client Behavior Characterization Swaminathan, N. Raghavan, S.V., International Symposium on Modeling, Analysis and Simulation of Computer and Telecommunication Systems, pp. 13-19, Sep. 2000.

A Schema-Based Approach to Web Engineering, Kuhnke, C. Schneeberger, J. Turk, A., System Sciences, SCHEMA Electronic Documentation Solutions pp. 10, Jan. 2000.

A Survey of Web Caching Schemes for the Internet: ACM SIGCOMM Computer Communication Review, pp. 36-46, Oct. 1999.

Client-Server Computing in Mobile Environment, Jin Jing. Abdelsalam Helal and Ahmed Elmagarmid, ACM Computing Surveys, vol. 31 No. 2, Jun. 1999.

Active Cache: caching dynamic contents on the Web, Pei Cao, Jin Zhang and Kevin Beach, The British Computer Society, The Institution of Electrical Engineers & IOP Publishing Ltd., 1999.

Goulde, M., Network Caching Guide: Optimizing Web Content Delivery, Boston, MA, Patricia Seybold Group, Mar. 1999, pp. i-42.

Mogul, J. et al, "HTTP Delta Clusters and Templates", Aug. 24, 2000. draft-mogul-http-dcluster-00.txt.

Accomazzi, A. "rproxy", 1999-2001 By Martin Pool.

* cited by examiner

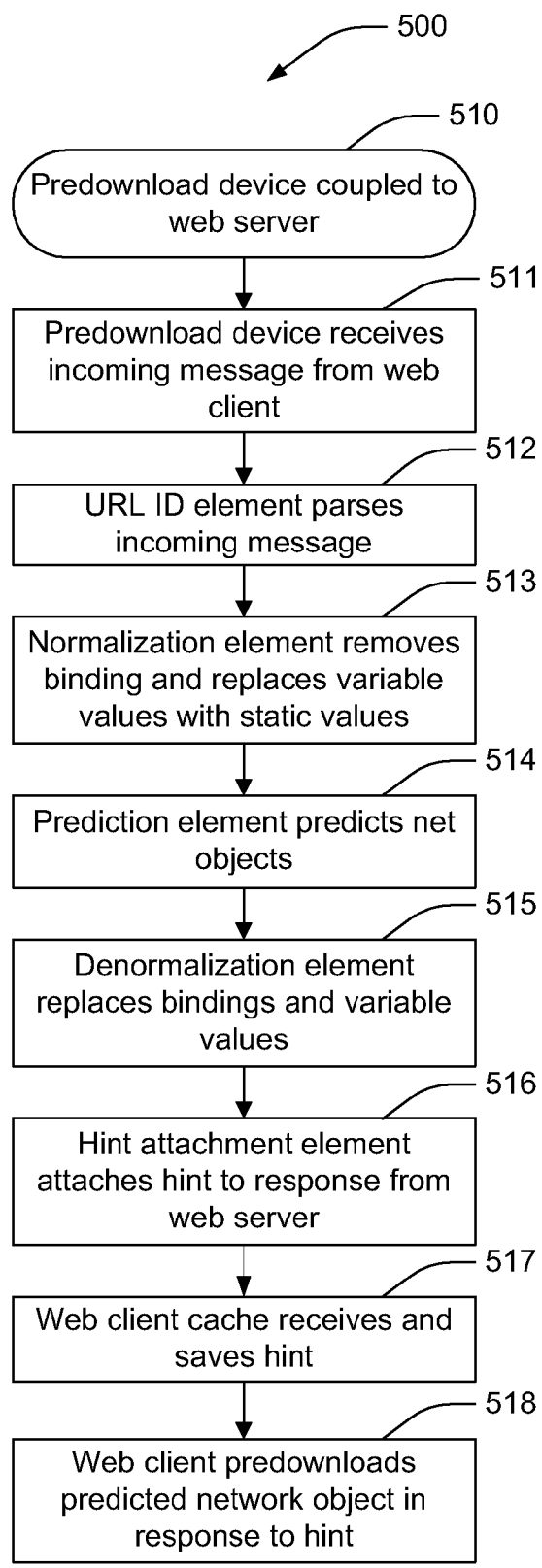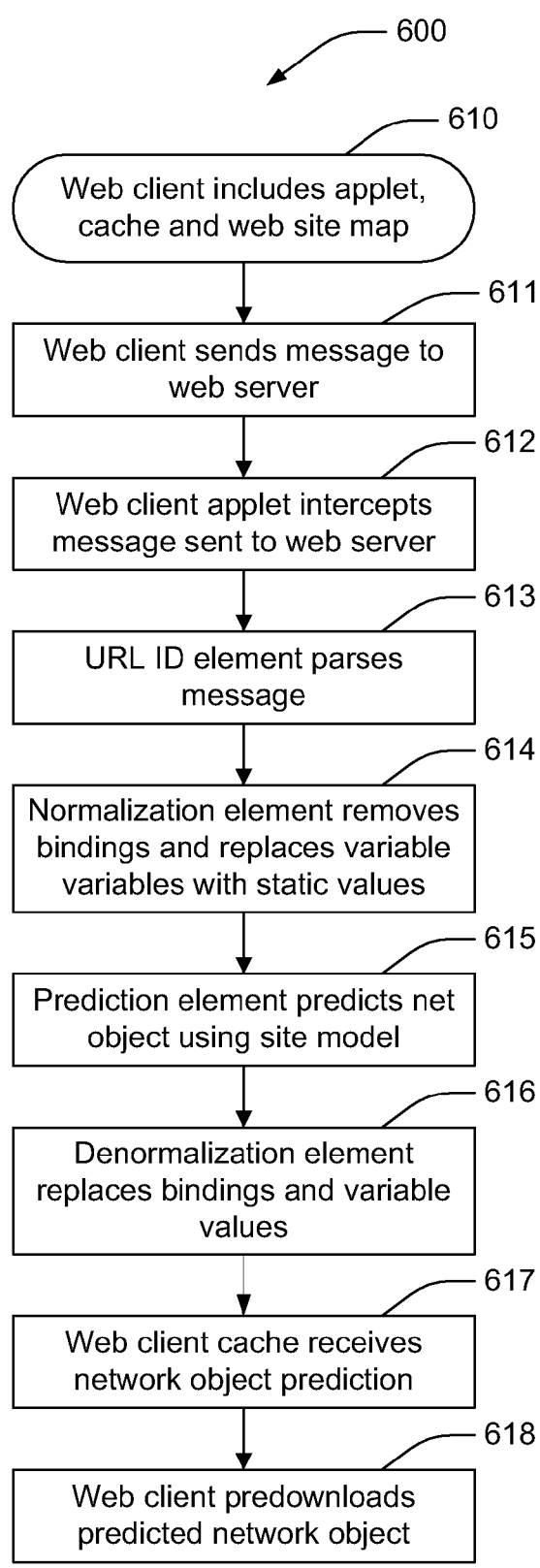
FIG. 5
FIG. 6

NETWORK OBJECT PREDICTIVE PRE-DOWNLOAD DEVICE

CROSS-REFERENCE TO RELATED APPLICATION

This application is a continuation of application Ser. No. 11/262,225, filed Oct. 28, 2005, entitled "Predictive Pre-Download of a Network Object," and issued as U.S. Pat. No. 7,548,947 on Jun. 16, 2009 which is a continuation of application Ser. No. 09/734,910, filed Dec. 11, 2000, entitled "Predictive Pre-Download Using Normalized Network Object Identifiers," and issued as U.S. Pat. No. 6,981,017 on Dec. 27, 2005, which is a continuation-in-part of application Ser. No. 09/436,136, filed Nov. 9, 1999, entitled "Predictive Pre-Download of Network Objects," and issued as U.S. Pat. No. 6,721,780 on Apr. 13, 2004; and hereby incorporated by reference.

BACKGROUND OF THE INVENTION

1. Field of the Invention

This invention relates to pre-download of network objects from a server and incorporates a process for normalizing a network object identifier in a request message.

2. Related Art

In computer networks, client devices often request and receive information from server devices. A common example of such client-server information occurs during use of the World Wide Web, in which a web client (sometimes called a web "browser") requests web pages and embedded network objects from a web server (sometimes called a "web site").

One problem in the known art is that web clients experience some delay between the time they request a web page from a web server and the time that that web page is presented by the web client software to the user. This delay can be due to the size of the web page, the limited connection bandwidth, the network distance to the web server, the load on the web server, or other factors.

A method exists that provides a technique for pre-download of network objects from a server, such as is used in conjunction with an internetworking environment, which reduces the time users wait for delivery and presentation of those network objects. A device which is coupled to the web-server maintains statistical information regarding which network objects are most likely to be requested by users and gives hints to a client-side component to pre-download those network objects to associated web clients in advance of actual requests being made by the user for those network objects. This is achieved by analyzing the request messages sent by the user to predict which subsequent network objects are likely to be requested by that user.

This method is less effective when the network object identifier, such as a URL (Uniform Resource Locator), contains a search string, a variable, or some other dynamic value. In such cases, two problems are likely to occur: (1) the number of possible URL's becomes arbitrarily large and unmanageable because each page has an infinite number of URL's that refer to it; and (2) the predictive value is decreased because the URL is specific to a single user, such as when the value is a user identifier, and there are too few links between similar URL's. The invention provides a method for increasing the effectiveness of the pre-download method and system.

SUMMARY OF THE INVENTION

The invention provides a method and system for pre-downloading network objects from a server when requests for those network objects contain dynamically changeable identifiers with variable data included. In a web server, there is a device which maintains information regarding which network objects are most likely to be requested by users, and which pre-downloads those network objects to associated web clients in advance of user prompted requests. The invention provides a method and system for (1) normalizing requests containing variables; (2) retrieving a normalized prediction; (3) de-normalizing the prediction; and (4) pre-downloading a network object in response to the de-normalized prediction. The invention incorporates a pre-download statistic server to assist in adjusting the prediction process. With this process, the invention is better able to predict which network objects will be requested by the user and reduce the time the user waits for delivery of those network objects.

BRIEF DESCRIPTION OF THE DRAWINGS

FIG. 5 shows a process flow diagram of a preferred method for predicting and pre-downloading network objects from a server.

FIG. 6 shows a block diagram of an alternative method for predicting and pre-downloading network objects from a web server.

DETAILED DESCRIPTION OF THE PREFERRED EMBODIMENT

Figure 1:
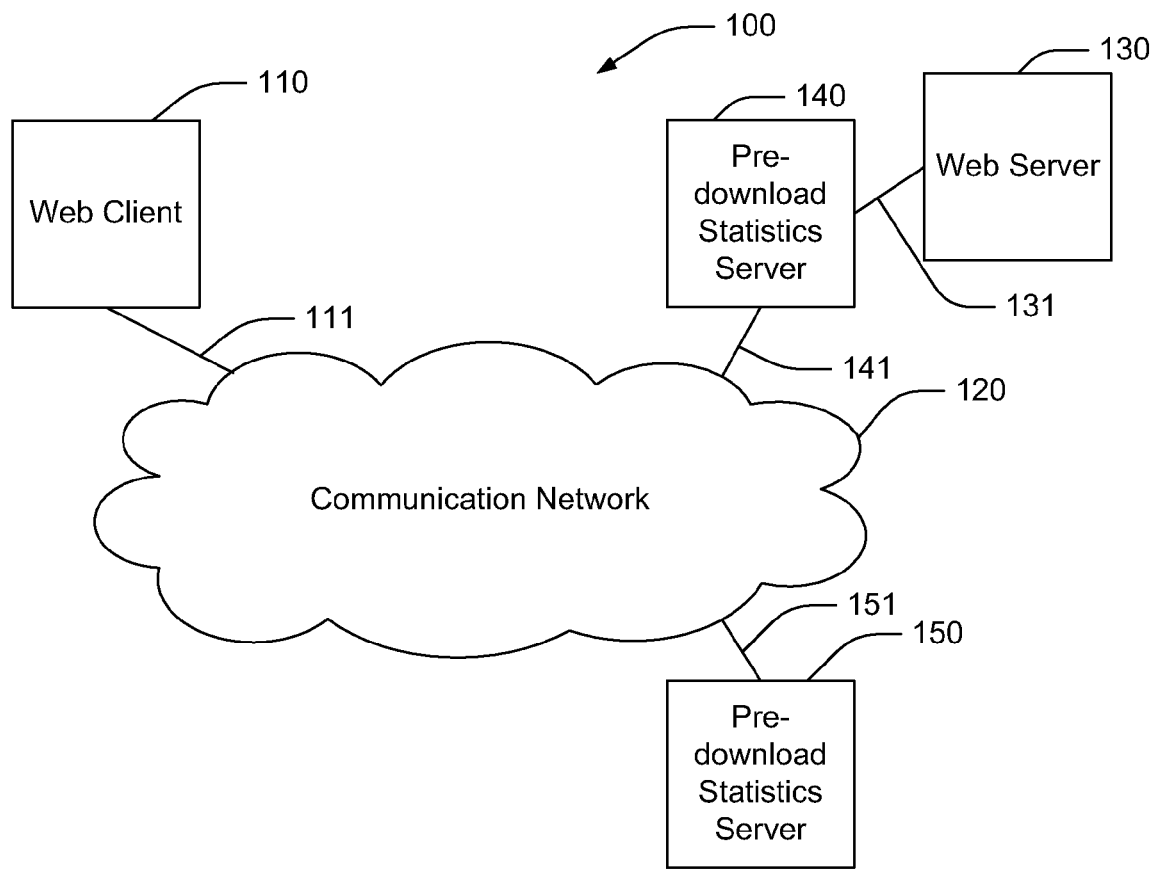
FIG. 1 shows a block diagram of a system for pre-downloading network objects from a Web server 130.

In the following description, preferred and alternative embodiments of the invention are described with regard to process steps and data structures. Embodiments of the invention can be implemented using general purpose processors or special purpose processors operating under program control, or other circuits, adapted to particular process steps and data structures described herein. Implementation of the process steps and data structures described herein would not require undue experimentation or further invention.

Lexicography

The following terms refer or relate to aspects of the invention as described below. The descriptions of general meanings of these terms are not intended to be limiting, only illustrative.

Network objects—In general, web pages and data elements embedded therein.

Web server—In general, a server for providing web pages and data elements therein to requesting clients.

Pre-download—In general, requesting web pages and data elements, by a web client from a web server, before a user at that web client specifically requests them.

Actual request—In general, an action taken by a user to specifically request any network object.

Delivery—In general, sending a web page from a web server to a web client.

Statistical information—In general, information regarding which network objects and links between network objects appear on a web page and which network objects are relatively more or less likely to be selected by a user viewing that web page.

Pre-download hint (Hint)—In general, information provided by a web server to web clients prompting the Web client to request pre-download of network objects before a user prompted request for those predicted network objects is made.

Pre-download rules—In general, information at a web server regarding which network objects are relatively more or less desirable for the user to receive without delivery latency.

Pre-download Applet—In general, a program that may be distributed as an attachment and transferred using a communications network, which causes at least some of the predictive elements of the system to be downloaded at the Web client.

Demographic information—In general, information about the user at a web client (such as their locale, time zone, or primary language.)

Past behavior—In general, information about a user responsive to whether that user is a frequent user of the web site, frequent purchaser of goods or services at that web site, or other relevant past behavior.

Web Client and Server—These terms refer to a relationship between two devices, particularly to their relationship as Web client and server, not necessarily to any particular physical devices.

For example, but without limitation, a particular Web client device in a first relationship with a first server device can serve as a server device in a second relationship with a second Web client device.

Client device and Server device—These terms refer to devices taking on the role of a Web client or a server in a Web client-server relationship (such as an HTTP Web client and web server.) There is no particular requirement that any Web client devices or server devices must be individual physical devices. They can each be a single device, a set of cooperating devices, a portion of a device, or some combination thereof.

Referrer URL—In general, the URL from which a request for download of a network object is made.

Target URL—in general, that portion of a Universal Resource Locator that refers to the location of the network object requested from the Web server.

Requestor Bit—In general, the binary digit contained in a request for a network object; such request usually originating from a user prompt at the Web client or from the Web client in response to direction by a pre-download device.

Requestor Bit Log—In general, a database recording whether requests for pre-download of network objects came from the user or the predictive download device.

Dynamic names—In general, a portion of a URL string that identifies the Web client or user and which is associated with a variable value. The string may contain state information of any kind and is dynamic if its value is not relevant for prediction purposes (i.e. if you can make better predictions by working on the quotient set rather than the set itself.)

Non-dynamic names—In general, a portion of a URL string that identifies a Web client and does not contain variable values.

Log File—In general, a file containing a list of the URL identifiers for Web clients.

Normalize—In general, the process of changing variable values to placeholder values.

Predict—In general, the process of determining which network objects are most likely to be requested by a user at the Web client.

As noted above, these descriptions of general meanings of these terms are not intended to be limiting, only illustrative. Other and further applications of the invention, including extensions of these terms and concepts, would be clear to those of ordinary skill in the art upon review of this application. These other and further applications are part of the scope and spirit of the invention, and would be clear to those of ordinary skill in the art, without further invention or undue experimentation.

System Elements

FIG. 1 shows a block diagram of a system for pre-downloading network objects from a server.

A system 100 includes a set of Web clients 110, a communication network 120, a Web server 130, a pre-download device 140, and a pre-download statistics server 150.

Each Web client 110 includes a processor, program and data memory, mass storage, and a client communication link 111. The processor, program and data memory and mass storage operate in conjunction to perform the functions of a Web client 110 (also known as a Web "browser"). The processor, program and data memory and mass storage may also function as a local Web client cache 160. In an alternative embodiment, the Web client 110 includes an applet 170 supplied by the Web server 130. The Web client 110, using the HTTP ("hypertext transfer protocol") requests network objects from the Web server 130 and, using HTTP responses, receives those network objects from the Web server 130. Although, in a preferred embodiment, the Web client 110 uses the HTTP protocol or variant thereof, there is no particular requirement for use of that specific protocol or its variants. The requests and responses are routed using the communication network 120 and are received and processed by the Web server 130.

The client communication link 111 operates to couple a Web client 110 to the communication network 120.

In a preferred embodiment, the communication network 120 includes an Internet, intranet, extranet, virtual private network, enterprise network, or another form of communication network. In a preferred embodiment, the communication network 120 includes a network capable of routing messages between and among one or more Web clients 110 and Web servers 130. However, there is no particular requirement that the communication network 120 must comprise an actual network, so long as the communication network 120 includes at least some technique for communication between the Web client 110 and Web servers 130.

The Web server 130 includes a processor, program and data memory, mass storage, and a server communication link 131. The processor, program and data memory, and mass storage operate in conjunction to perform the functions of a Web server 130 (also known as a web "site"). The Web server 130 responds to the Web client 110 using the HTTP protocol. Although, in a preferred embodiment, the Web server 130 uses the HTTP protocol or variant thereof, there is no particular requirement for use of that specific protocol or its variants.

The pre-download statistics server 150 includes a processor, program and data memory, mass storage, and a statistics server communication link 151. The pre-download statistics server 150 operates in a similar manner to a Web server 130, with a difference that the pre-download statistics server 150 receives and maintains pre-download statistics for the Web server 130. Interested parties can later examine those pre-download statistics; these could include a user at the Web client 110, an operator or web site administrator at the Web server 130, or a user (or program) at another device coupled to the communication network 120.

A prediction is made at the pre-download device 140 or at the Web client 110 to determine what web object the Web client 110 is likely to request from the Web server 130 based on the initial request.

Preferred Embodiment: Prediction Occurs at the Pre-Download Device

In the preferred embodiment, the pre-download device 140 intercepts requests for network objects from the Web client 110 as well as responses to the request from the Web server 130. The pre-download device 140 determines which network objects are most likely to be requested by the Web client 110 from the Web server 130. The pre-download device 140 then directs the Web client 110 to request those network objects from the Web server 130 prior to their actual request from a user at the Web client 110. Downloading of the requested network object begins immediately after the pre-download request is received by the server. Thus, the Web client 110 will have those network objects available in its local Web client cache 160 prior to any user prompted request for the same. If and when a user makes a request for the predicted and pre-downloaded network objects, the Web client 110 will be able to present those network objects to the user with relatively little latency.

Figure 2:
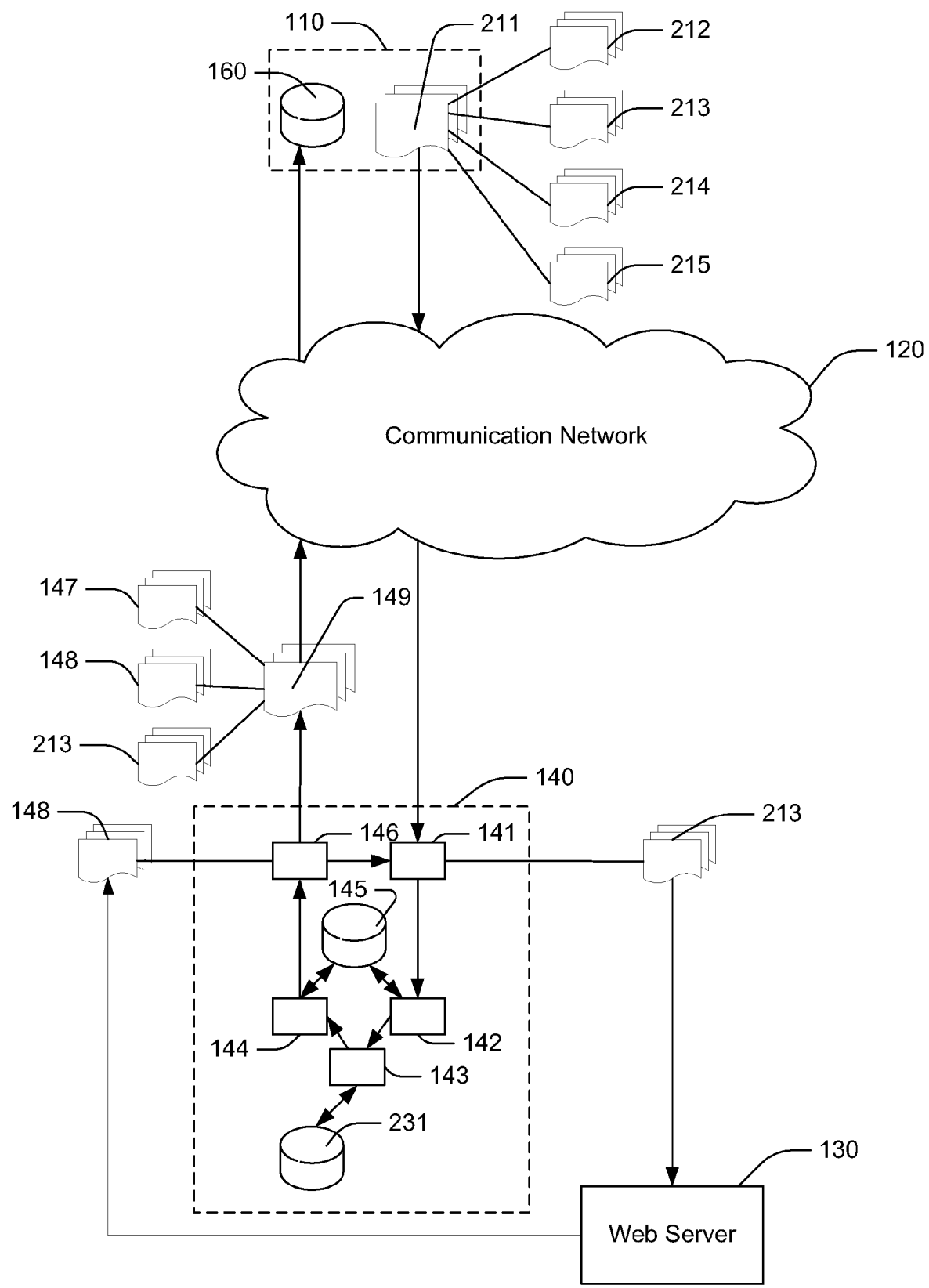
FIG. 2 shows a block diagram of a preferred embodiment of a system for pre-downloading network objects from a server using a pre-download device coupled with a Web server 130.

FIG. 2 shows a block diagram of a preferred embodiment of a system for pre-downloading network objects from a server using a pre-download device 140 coupled with a Web server 130.

Each message 211 includes a first URL 212 (referred to herein as a "referrer URL") indicating a referring network object, and a second URL 213 (referred to herein as a "target URL") indicating a requested network object. Each message 211 also includes a requester-bit 214, indicating whether the request for the network object comes from a user prompted request made at the Web client 110, or from the Web client 110 in response to a hint provided by the pre-download device 140. Each message 211 also includes additional relevant information 215 such as a time stamp, a source IP address and port, and a destination IP address and port.

The pre-download device includes a URL identification element 141, a normalization element 142, a prediction element 143, a denormalization element 144, a variable database 145, a hint attachment element, and a Web site graph 231. The Web site graph 231 may be stored either locally or externally.

The combination of the URL identification element 141, the normalization element 142, the prediction element 143, a denormalization element 144, the variable database 145, the hint attachment element 146, and the Web site graph 231, also may be referred to as a request processing element.

The pre-download device 140 intercepts a message 211 (i.e. and request for a network object) from a Web client 110 to the Web server 130 and the response 148 (i.e. the network object) sent from the Web server 130 to the Web client 110.

Upon receipt of the message by the pre-download device, the URL identification element 141 parses the message 211 and identifies the referrer URL 212, the target URL 213, the requester bit 214, and any additional relevant information 215 contained in the message 211 about the user or the Web client 110, such as a time stamp, the source IP address and port, and the destination IP address and port.

The normalization element 142 then accesses the variable database 145 and determines which values contained in the target URLs are dynamic (i.e. are variables). The normalization element 142 removes the bindings from the dynamic target URLs and replaces them with placeholder values.

The prediction element 143 accesses the Web site graph 231 and predicts which network objects the Web client 110 is likely to request from the Web server 130. The prediction, otherwise known as a "hint," is in a similar form as the normalized target URL and may contain placeholder values.

The denormalization element 144 then accesses the variable database 145 and substitutes in the hint URL the bindings previously removed from the target URL. The hint 147 is then sent to the Web client 110.

The hint attachment element 146 attaches the hint 147 to the requested network object 148 received from the Web server 130. As a result, the hint response and the network object 148 are sent together 149 through the communication network 120 to the Web client 120.

The Web client 110 receives the hint 147 and responds by pre-downloading the network object that corresponds to the hint 147. Thus, the Web client 110 pre-downloads the predicted network object prior to Web client 110 making a user prompted request for that network object. Thus, the latency period between an actual request for a network object and the download of the network object is decreased.

Alternative Embodiment: Prediction Occurs at the Web Client

Figure 3:
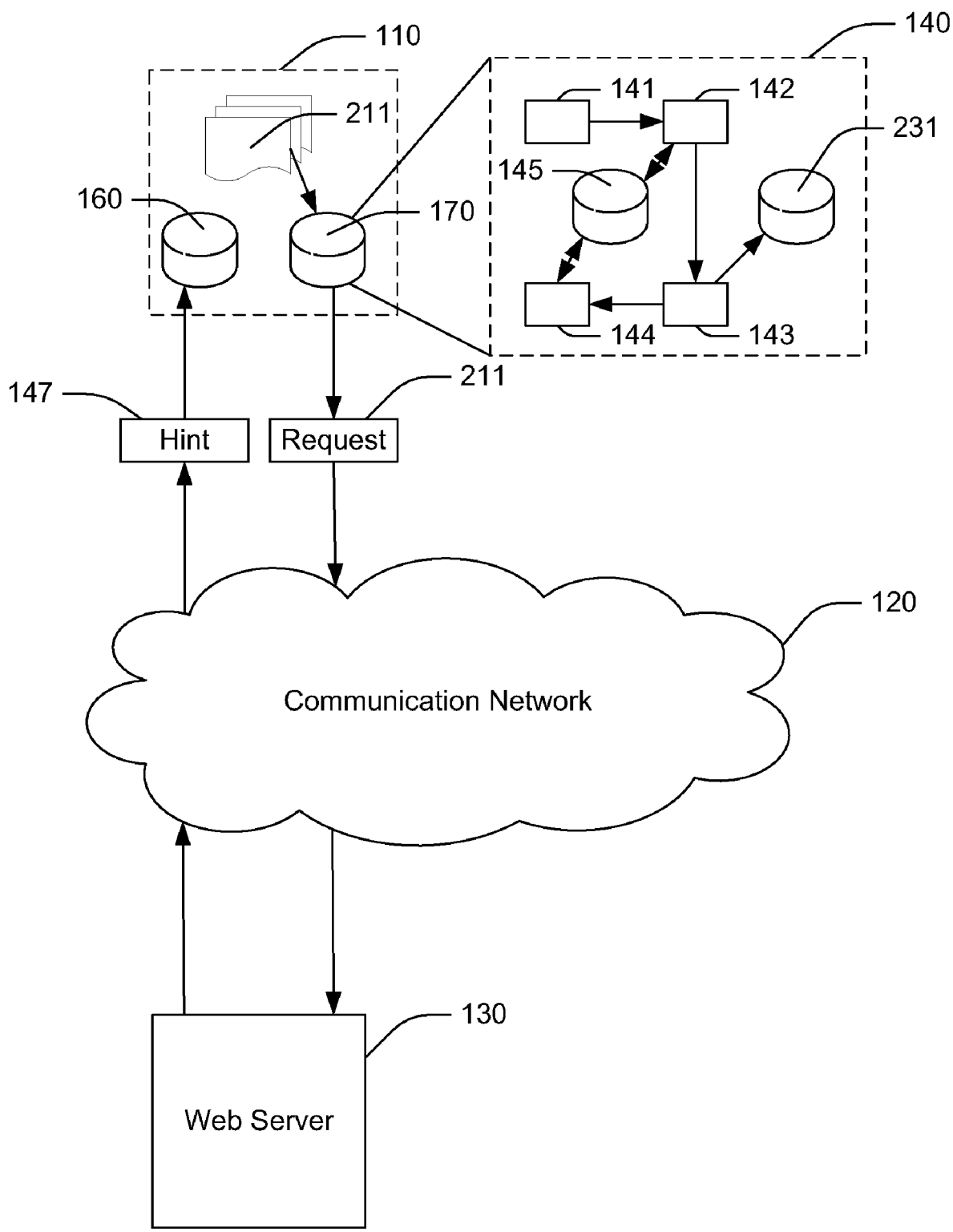
FIG. 3 shows a block diagram of an alternative embodiment of a system for pre-downloading network objects from a Web server using an applet 170 stored on a Web client 110.

FIG. 3 shows a block diagram of an alternative embodiment of a system for pre-downloading network objects from a server using an applet 170 stored on a Web client 110.

In an alternative embodiment, at least part of the prediction process occurs at the Web client 110 and not at the pre-download device 140. The Web client 110 contains an applet 170 including a URL identification element 141, a normalization element 142, a prediction element 143, a denormalization element 144, a variable database 145, and a Web site graph 231, similar to those elements shown in FIG. 2. In this alternative embodiment, inclusion of a hint attachment element 146 depends on whether the applet is written such that the functionality of the predownload process occurs in the same process as the Web client 110 (in which case it would not be needed) or whether the predownload process runs separate from the process of the Web client 110 (in which case it may be included to attach the hint 147). As in the preferred embodiment, the Web site graph 231 may also be stored either locally or externally.

The combination of the URL identification element 141, the normalization element 142, the prediction element 143, the denormalization element 144, the variable database 145, and the Web site graph 231, also may be referred to as a request processing element.

The Web client 110 sends a user prompted request (i.e. a message 211) to the Web server 130 requesting a specified network object.

As in the preferred embodiment of the system, each message 211 includes a first URL 212 (the "referrer URL") indicating a referring network object, and a second URL 213 (the "target URL") indicating a network object. Each message 211 also includes additional relevant information 215, such as a time stamp, a source IP address and port, and a destination IP address and port. Each message 211 also includes a requester-bit 214, indicating whether the request for the target network object comes from a user prompted request made at the Web client 110, or from the Web client 110 in response to direction by the applet 170.

The URL identification element 141 parses the request and identifies the referrer URL 212, the target URL 213, the requester bit 214, and any additional relevant information 215 such as a time stamp, the source IP address and port, and the destination IP address and port.

The normalization element 142 then accesses the variable database 145 and determines which values contained in the referrer URL's are dynamic (i.e. are variables). The normalization element 142 removes the bindings from the dynamic referrer URLs and replaces them with placeholder values.

The prediction element 143 accesses the Web site graph 231 and predicts which network objects the Web client 110 is likely to request from the Web server 130. The prediction 147, otherwise known as a "hint," is in a similar form as the normalized target URL and may contain placeholder values. Although the prediction 147 may be based on the likelihood that a user will request a certain network object, the prediction may be based on other factors as discussed in other parts of this application.

The denormalization element 144 then accesses the variable database 145 and replaces the bindings and dynamic values previously removed from the referrer URLs by the normalization element 142. The hint 147 is then sent to the Web client 110.

The Web client 110 receives the hint 147 and responds by pre-downloading the predicted network object before the Web client 110 makes a user prompted request for that network object. If and when a user prompted request is made at the Web client 110 for the predicted and pre-downloaded network object, that target object will already have been requested. Thus, the latency period between the time the user makes a request at the Web client 110 for a predicted network object and the download of that network object is decreased.

Maintenance of Statistical Information Using a Web-Site Graph

Figure 4:
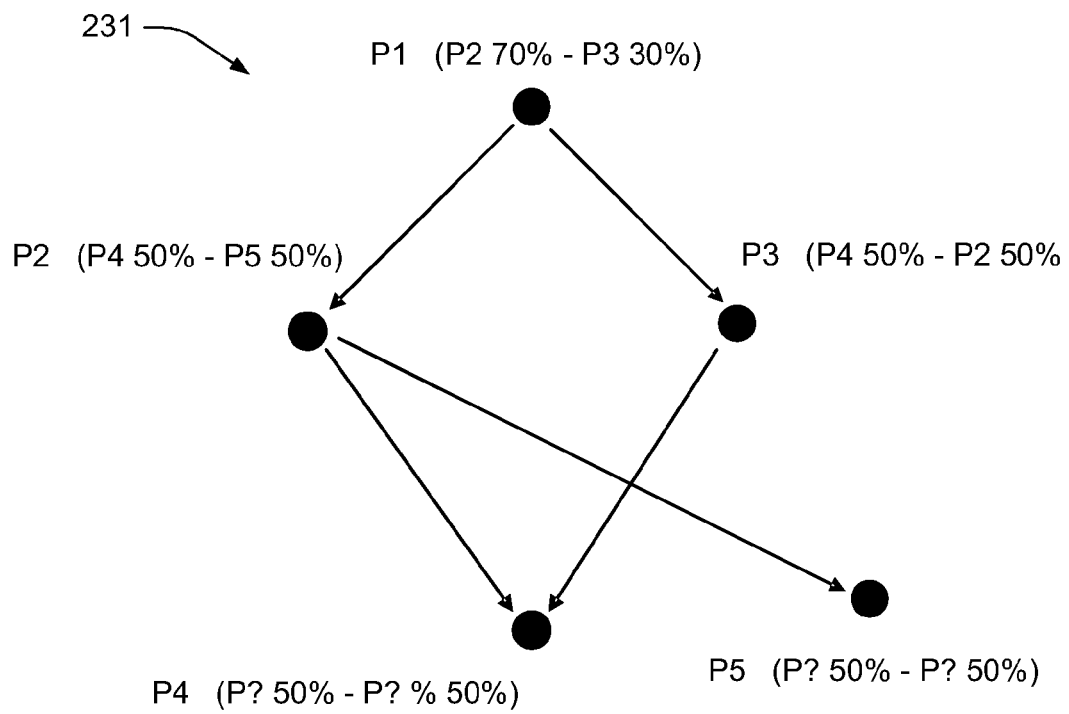
FIG. 4 shows a Web site graph 231.

FIG. 4 shows an example of a Web-site graph 231.

The nodes shown on FIG. 4 represent network objects that exist on a web site (i.e. a web destination hosted by a web server 130.) For example, node P1 may represent a single network object (e.g. the text on a first page of a web hosted document.) Predictive statistics associated with node P1 may correlate with a likelihood that a user will make a request at the Web client 110 for other network objects (or pages) located at the server hosted web site. In FIG. 4, for example, network object P1 is associated with network objects P2 and P3.

In addition to associations between network objects, the Web site graph 231 may reflect predictive statistics or weighted values that may control the order in which associated network objects are pre-downloaded to the Web client 110. FIG. 4, the predictive statistics or weighted values associated with network objects P2 and P3 are 70% and 30% respectively. These statistics or values may reflect such factors as the likelihood that P2 or P3 will be requested by the user immediately subsequent to users request for P1. Considering these predictive statistics, the pre-download device may cause P2 to be pre-downloaded before P3. Alternatively, pre-download priority may be set by weighted values assigned by an operator or web site administrator.

Predictive statistics may reflect probabilities, as stated above, based on actual results made by a single user or any number of users over time. A statistics server 150 may be employed to keep a tally of all requests made by a single web server or a number of web servers and adjust associations between network objects as well as statistics or values affecting pre-download order.

Predictive statistics or weighted values may be based on the content and architecture of the web site. For example, P1 represent a first page of text of a web hosted document and P2 represent the second page text. The pre-download statistics server or a web administrator may assign a value of 70% to P2 because there is a 70% chance that users who view the first page will make a subsequent request for the second page. If, for example, network object P3 represents the table of contents of the web site, the assigned value of 30% may reflect a 30% chance that users who view the first page will not be interested in viewing the second page and will subsequently request the table of contents. While the values associated with each network object may reflect statistics automatically calculated by a statistics server, they may also be assigned manually.

The values associated with each network object on the graph may reflect other factors such as the size of the network object. For example, the pre-download statistics server or administrator may assign values to network objects based on the time it takes a user to review an associated network object relative to the time is takes to pre-download an associated network object. For example, if P1 is the title page of a web based document, one can expect that a user will take relatively little time to review it and request another page. If there will not be enough time to pre-download all associated file prior to the user making a subsequent request, the order in which associated network objects P2 and P3 are pre-downloaded may then depend on how long it takes each to be pre-downloaded (i.e. how large the files are.) For example, it may be preferable to pre-download the smaller file first so that user will better realize the benefit of the pre-download process. Alternatively, it may be preferable to pre-download larger files first because the time to download a smaller network object may be negligible. The pre-download device and pre-download statistics server may adjustable to incorporate any number of preferences.

The Web site graph 231 not only reflects predictive statistics or weighted values regarding such network objects as web-pages, but to network objects that are actually embedded elements within those web-pages. Thus, if a web-page contains embedded elements, these elements will be requested by the Web client 110 at the same time as their parent web-page. In terms of the example provided in FIG. 4, if P2 denotes a network object that is a web page and that web page contains embedded element E1, then the likelihood that E1 will be requested is the same as the likelihood P2 will be requested, or 70%. Additionally, since elements may be shared by different web pages, they may be statistically more likely to be requested. For example, if both P2 and P3 have embedded element E1, then E1 will be requested 100% of the time (according to FIG. 4), and is, thus, statistically more likely to be requested that either P1 or P2.

Alternatively, the predictive statistics or weighted values associated with network object on the web site graph 231 may reflect the objectives of the web site or the preferences of a web site administrator. For example, the pre-download device and pre-download statistics server may be programmed to pre-download certain network objects regardless of user preferences or other factors. Where the objective of the site is to produce income through online purchase, for example, the administrator may want to make sure that the user does not have to wait for download of the network objects associated with making a purchase (such as the check-out page.) The web site administrator may adjust the web site graph so that when a Web client 110 requests a network object showing pricing for certain product available for purchase, that the network object showing check out information is pre-downloaded immediately.

The web site graph may be modified automatically using pre-download statistics server 150 or modified manually by an operator or the web site administrator. The pre-download statistics server 150 may determine network object association and calculate probabilities based on averages calculated for all users accessing the site, averages based on any single users or group of users activity, or preferences based on demographic factors such as geographical location, age, or income. The web site graph may be modified according information provided by users in response to online questionnaires. Probabilities and/or profiles pertaining to particular users or user groups may be stored in the pre-download statistics server 150 database and accessed each time a user accesses the subject web site.

The embodiments described above are not mutually necessarily exclusive and may be used in combination.

Preferred Embodiment: Prediction Incorporating Use of a Requestor Bit Log

In a preferred embodiment, the invention incorporates a Requestor Bit Log which keeps track of whether requests for pre-download of network objects were made by the user or by the predictive pre-download device. The four possible states associated with each request for pre-download are: 1) a request made by the user which was not previously pre-downloaded; 2) a request made by the user which was previously pre-downloaded and recorded in the Requestor Bit Log, 3) a request made by the predictive pre-download device which was not previously recorded in the Requestor Bit Log, and 4) a request made by the predictive pre-download device which was previously recorded in the Requestor Bit Log. A request is not recorded in the Requestor Bit Log if the requested network object had already been pre-downloaded (i.e. when the prediction was successful) or when the user downloads a network object that the predictive pre-download device did not predict the user would request (which is the case, for example, when the user hits the "back" button to revisit a target object that that user has already reviewed and the predictive pre-download devise could not predict the user would be reviewing.)

The purpose of the Requestor Bit Log is to insure that the statistics which may be attached to each associated network object on the web site graph 231 reflect requests and preferences from the user and not requests for pre-download from the pre-download device 140. By distinguishing user prompted requests from pre-download requests prompted by the pre-download device, the system may prevent improper associations between network objects or skewed statistics based on requests prompted by the pre-downloaded device which were not subsequently made by the user.

The Requestor Bit Log may exist as part of the part of the pre-download statistics server, the pre-download device, the pre-download applet, or some other device or program connected to the system through the communications network.

Preferred Method of Prediction and Pre-Download

FIG. 5 shows a process flow diagram of a preferred method for predicting and pre-downloading network objects from a server.

Method 500 is performed by the system 100. The method is described and performed serially.

At a flow point 510, the pre-download device 140 is coupled to the Web server 130, and is ready to receive incoming requests from one or more Web clients. The pre-download device 140 includes a URL identifying element 141, a normalization element 142, a prediction element 143, a denormalization element 144, a variable database 145, and a hint attachment element 146.

At a step 511, the pre-download device 140 receives an incoming message 211 from a Web client 110 asking for a network object from the Web server 130.

At a step 512, the URL identification element 141 parses the message 211 and identifies the referrer URL, the target URL, and any other relevant information contained in the request about the user or the Web client 110, such as the source IP address and port At a step 513, the normalization element 142 uses the variable database to identify and remove the bindings from the dynamic referrer URLs and replace the variable values with static values.

At a step 514, the prediction element 143 accesses the Web site model graph and predicts which network object pages the Web client 110 is likely to request from the Web server 130. The prediction is known as a "hint".

At a step 515, the denormalization element 144 accesses the variable database 145 and replaces the placeholder values in the hint URL with the dynamic values that were removed from the target URL by the normalization element 142.

At a step 516, the hint attachment element 146 attaches the hint to the requested network object and both are sent to the Web client 110.

At a step 517, the Web client 110 receives the hint and requested network object.

At step 518, the Web client 110 responds to the hint by requesting pre-downloads the predicted network object.

Alternative Method of Prediction and Pre-Download

FIG. 6 shows a block diagram of an alternative method for predicting and pre-downloading network objects from a web server.

A method 600 is performed by the system 100. The method is described and performed serially.

At flow point 610, a Web client 110 includes an applet 170 and local Web client cache 160.

At a step 611, the Web client sends a message 211 to the Web server 130 asking for a network object.

At a step 612, the applet 170 intercepts the message 211 sent to the Web server 130 asking for a network object.

At a step 613, the URL identification element 141 parses the message 211 and identifies the referrer URL, the target URL, and any other relevant information contained in the request about the user or the Web client 110, such as the source IP address and port At a step 614, the normalization element 142 removes the bindings from the dynamic referrer URLs and replaces variable values with static values pertaining to certain network objects stored on the Web server 130.

At a step 615, the prediction element 143 uses the Web site graph 231 to predict which network object pages the Web client 110 will request from the Web server 130. The prediction is otherwise known as a "hint").

At a step 616, the denormalization element 144 replaces the bindings and the dynamic values in the referrer URLs.

At a step 617, the local Web client cache 160 receives and saves the hint.

At step 618, the Web client 110 pre-downloads a request for a network object in response to the hint.

Pre-Download Device

Figure 7:
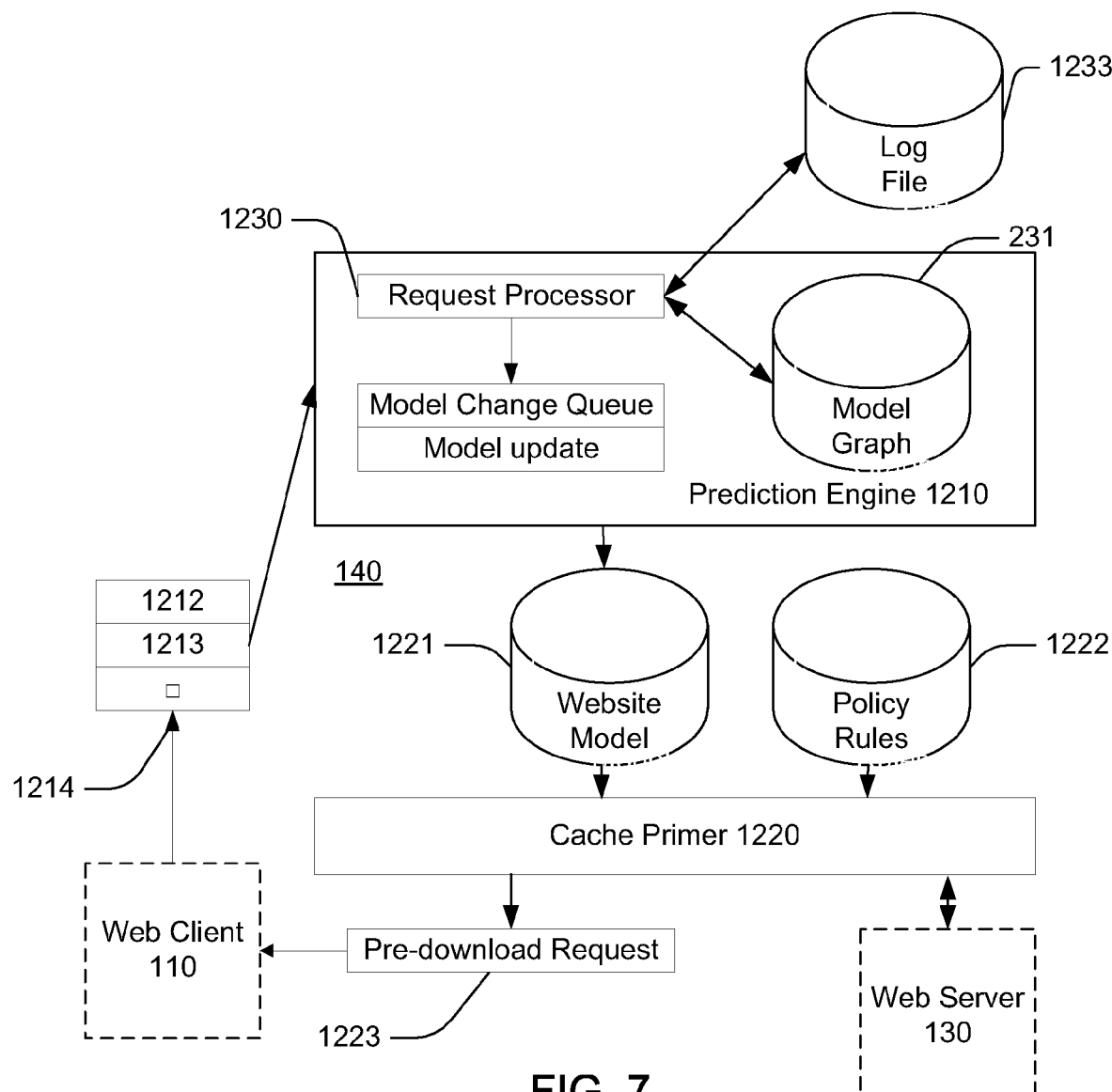
FIG. 7 shows a block diagram of a pre-download device, as used in a system for pre-downloading network objects from a server.
Figure 8:
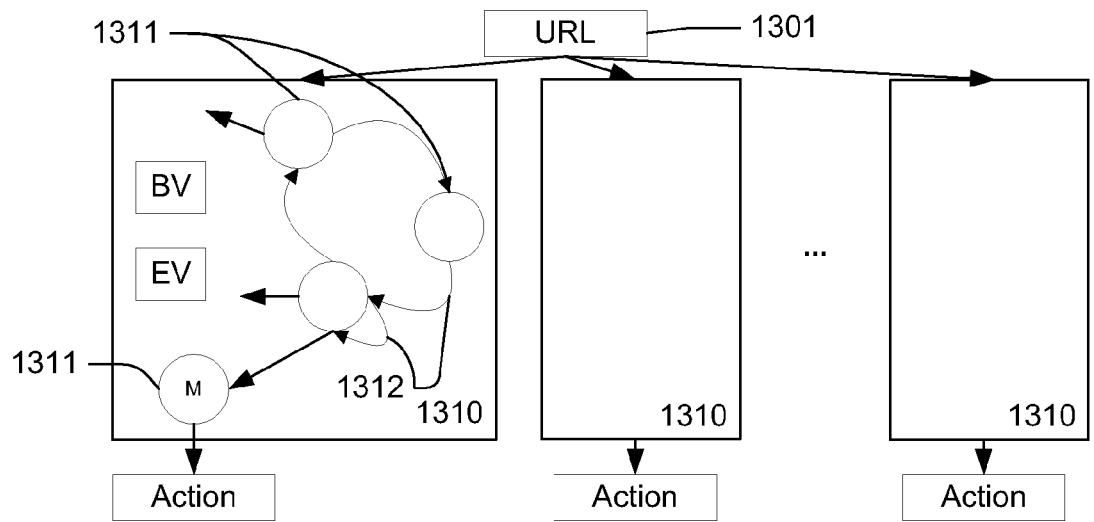
FIG. 8 shows the use of a finite state machine to detect the presence of an incoming URL possibly managing each regular expression.
Figure 9:
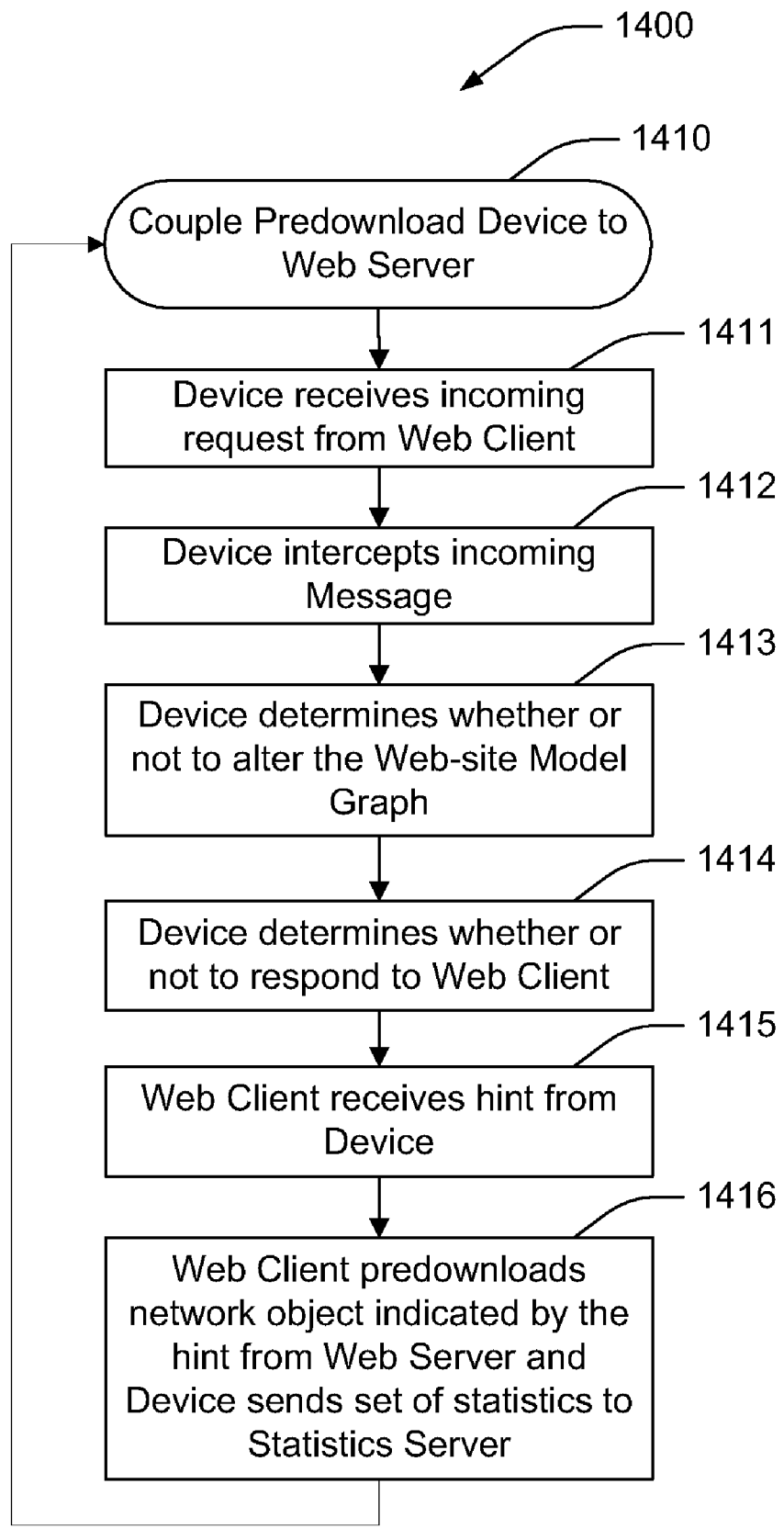
FIG. 9 shows a process flow diagram of a method for operating a system for pre-downloading network objects from a server.

FIGS. 7, 8 and 9 show an alternative preferred embodiment system to the system shown and described in FIGS. 2 through 6. FIG. 7 shows a block diagram of a pre-download device, as used in a system for pre-downloading network objects from a server. The pre-download device 140 includes a prediction engine 1210, and a cache primer 1220.

Prediction Engine

The prediction engine 1210 intercepts and processes a sequence of messages 1211 including requests from the Web client 110 that are directed to the Web server 130.

Each message 1211 includes a first URL 1212 indicating a referring network object, and a second URL 1213 indicating a target network object. Each message 1211 also includes additional information, including a time stamp, a source IP address and port, a destination IP address and port, and a file size for the target network object. Each message 1211 also includes a requester-bit 1214, indicating whether the request for the target network object comes from an actual request by user at the Web client 110, or from the Web client 110 in response to direction by the pre-download device 140.

The prediction engine 1210 includes a request-processing element 1230, a web-site model graph 1231, a model-change queue 1232, and a model-updating element 1240.

In a preferred embodiment, the request-processing element 1230 includes a separate processing thread, so as to operate in conjunction or in parallel with other operations performed by the prediction engine 1210. Separate processing threads are known in the art of computer systems architecture.

The request-processing element 1230 maintains the Web-site model graph 1231, including a directed graph of nodes (each indicating a network object), and transitions between nodes (each indicating a possible transition selected by a user at the Web client 110).

The request-processing element 1230 receives each message 1211, and parses the message 1211 for the first URL 1212, the second URL 1213, and the requester-bit 1214. In response thereto, the request-processing element 1230 determines (in the Web-site model graph 1231) an initial node, a final node, a transition from the initial note to the final node, and a measure of a weighted probability of transition from to the final note from the initial node.

The request-processing element 1230 can determine from each message 1211 whether that message 1211 was responsive to an actual request by a user at the Web client 110. If so, the request-processing element 1230 writes information from that message 1211 to a raw log file 1233.

The raw log file 1233 comprises information regarding traffic at the Web 1111 server 130, so the Web server 130 can run an independent process or thread for determining conclusions from that traffic information.

Since the Web site 130 is a collection of network objects that may possibly change over time, there are likely to be periodic changes to the Web-site model graph 1231. These changes can include new nodes, new transitions, and new weighted probabilities assigned to transitions in response to selections made by the user at the Web client 110.

Accordingly, the request-processing element 1230, in response to changes to the Web-site model graph 1231, maintains the model-change queue 1232, indicating relatively recent changes to the web-site model graph 1231.

In a preferred embodiment, the model-updating element 1240 includes a separate processing thread, so as to operate in conjunction or in parallel with other operations performed by the prediction engine 1210.

The model-updating element 1240, responsive to the model-change queue 1232, determines whether and when there have been sufficient changes to the web-site model graph 1231 to rewrite a Web-site model database 1221. For example, the model-updating element 1240 can determine there have been sufficient changes to the web-site model graph 1231 when the model-change queue 1232 is longer than a pre-selected threshold. When there have been sufficient changes to rewrite the web-site model database 1221, the model-updating element 1240 performs the update.

Cache Primer

The cache primer 1220 responds to each message 1211, to the web-site model database 1221, and to a policy rules database 1222, to generate a sequence of pre-download request messages 1223. Each pre-download request message 1223 instructs the Web client 110 to request one or more target network objects without any actual request for those target network objects from a user at the web client 110.

In a preferred embodiment, the cache primer 1220 acts as a reverse-proxy device, thus caching network objects from the Web server 130 for sending to Web clients 110. In so doing, the cache primer 1220 preferably follows a set of administrative rules, including one or more of, or some combination of, the following:

The cache primer 1220 is responsive to facts about the Web server 130, such as a computation load on the Web server 130, or a time of day or data of the week at the Web server 130.

The cache primer 1220 is responsive to facts about the Web client 110, such as a source IP address and port, a user ID for a user at the Web client 110, or a cookie stored at the Web client 110. In a preferred embodiment, a cookie stored at the Web client 110 can include a purchase history for the user, demographic information for the user, or other information about the user that might be a value (such as their ISP, country of origin, or time zone).

The cache primer 1220 is responsive to facts about the usage of the Web server 130 by the user at the Web client 110, such as an amount of time spent by the user at the Web server 130, a number of links followed by the user local to the Web server 130, or a relative distance of the requested network object from a "purchase page" or other important network object at the Web server 130.

The cache primer 1220 examines each intercepted message 1211, and determines whether one or more policy rules in the policy rules database 1222 applies to that intercepted message 1211. The policy rules database 1222 includes a set of pairs, each of which it tends to match against a requested URL, and an identifier for the Web client 110, and each of which indicates a hint for a network object to be pre-downloaded, in response to a matched policy rule. For example, a policy rule can attempt to match against a particular user and a particular Web client 110, so as to take that particular user directly to a "purchase page" or other important network object at the Web server 130.

In a preferred embodiment, the policy rules database 1222 is constructed in the form of an expert pattern language, using a graphical user interface and developed by an operator (not shown) at the cache primer 1220.

If no policy rules from the policy rules database 1222 are successfully matched against the intercepted message 1211, the cache primer 1220 defaults at a lowest priority to statistical information in the web-side model database 1221.

As noted above, the web-site model database 1221 is constructed in response to incoming messages 1211. In a preferred embodiment, the policy rules database 1222 also includes a set of statistical matching rules, each of which it tends to match against an incoming URL having imaginable pattern.

Each statistical matching rule includes a matchable regular expression, and a rule for generating a node or transition in the web-site model graph 1231, and the same note or transition in the web-site model database 1221. Regular expressions are known in the art of compilers and pattern matching.

In a preferred embodiment, the cache primer 1220 uses a finite state machine to detect the presence of an incoming URL possibly matching each regular expression. The use of the finite state machine is further described with reference to FIG. 8.

Finite State Machine

FIG. 8 shows the use of a finite state machine to detect the presence of an incoming URL possibly managing each regular expression.

An incoming URL 1301 is input, one character at a time, in parallel, to a set of finite state machines 1310. Each finite state machine 1310 includes a plurality of nodes 1311 and a plurality of transitions 1312. Each transition 1312 is triggered explicitly by a single defined character, or by a single character of any type. Each node 1311 can also be labeled with a "begin variable" or an "end variable" marker, so as to begin or end a character-string variable. One selected node 1311 is labeled as a "match/no match" node 1311, and associated with an action to be taken in response to matching the selected finite state machine 1310.

For example, a regular expression can be such as that indicated in equation 1320:

^1id=^2&^3

In equation 1320, the boldface value is preceded by a ^, such as ^ 1, indicate a character-string variable to be parsed and identified by at least one finite state machine 1310. The non-boldface characters, such as "id=", are recognized by at least one finite state machine 1310, so as to parse and identify at least one associated character-string variable.

As noted above, each incoming URL 1301 is input in parallel to a plurality of finite state machines 1310. Thus, matching (or possible determination of non-match) of the each incoming URL 1301 can be performed in order of (constant time).

Method of Operation

FIG. 9 shows a process flow diagram of a method for operating a system for pre-downloading network objects from a server.

A method 1400 is performed by the system 100. Although the method 1400 is described serially, the steps of the method 1400 can be performed by separate elements in conjunction or in parallel, whether a synchronously, in a pipelined manner, or otherwise. There is no particular requirement that the method 1400 be performed in the same order in which this description lists the steps, except where so indicated.

At a flow point 1410, the pre-download device 140 is coupled to the Web server 130, and is ready to receiving incoming requests from one or more Web clients 110.

At a step 1411, the pre-download device 140 receives an incoming request from a Web client 110.

At a step 1412, the pre-download device 140 intercepts an incoming message 1211 associated with the incoming request. As part of this step, the pre-download device 140 parses the incoming message 1211 for a reference URL and for a target URL. As part of this step, the pre-download device 140 determines both the reference URL and the target URL, and any other relevant information about the user or the Web client 110, such as the source IP address and port.

At a step 1413, the pre-download device 140 determines whether or not to alter the web-site model graph 1231 (such as by adding nodes, adding transitions, for altering weighted probabilities associated with internode transitions). As part of this step, the pre-download device 140 determines whether or not to rewrite the Web-site model database 1221.

At a step 1414, the pre-download device 140 determines whether or not to respond to the Web client 110 with a hint, indicating a network object to pre-download from the Web server 130. If so, as part of this step, the pre-download device inserts the hint into the network object, before sending the network object from the Web server 130 to the Web client 110.

At a step 1415, the Web client 110 receives the hint from the pre-download device 140 (along with the network object it requested from the Web server 130).

At a step 1416, the Web client 110 pre-downloads the network object indicated by the hint from the Web server 130. As part of this step, the request for the network object to be pre downloaded includes a requester-bit indicating that the network object is being requested in response to a hint from the pre-download device 140.

At a step 1416, the pre-download device 140 determines a set of statistics associated with actual requests from one or more users at Web clients 110, and outputs that set of statistics to the pre-download statistics server 150. As part of this step, the pre-download statistics server 150 maintains those statistics associated with actual requests for use by other parties.

The method continues with the flow point 1410.

Generality of the Invention

The invention has general applicability to various fields of use, not necessarily to the services described above. For example, these fields of use can include one or more of, or some combination of, the following:

Queries to database servers, in which queries are correlated with regard to database records when relatively close in time.

Requests for information from information libraries, in which queries are correlated with regard to library documents when relatively close in time.

Other types of requests for information from server devices.

Other and further applications of the invention in its most general form, would be clear to those skilled in the art after review of this application, and are within the scope and spirit of the invention.

ALTERNATIVE EMBODIMENTS

Although preferred embodiments are disclosed herein, many variations are possible which remain within the concept, scope, and spirit of the invention, and these variations would become clear to those skilled in the art after review of this application.

What is claimed is:

1. A network object predictive pre-download device operable on a network logically between a web client and a web server on a network, the pre-download device comprising:
   a prediction engine operatively configured to: (i) intercept a request from the web client to the web server for a first network object, (ii) determine a second network object most probable to be requested in the future from the web server, and (iii) intercept a request from the web client for the second network object; and
   a cache primer operatively configured to: (i) intercept a response to the request from the web server, (ii) send a first message to the web client comprising the response including the first network object and a hint identifying the second network object to be cached by the web client, and (iii) send the second network object to the web client in response to a second message from the web client sent in response to the web client receiving the first message such that the second network object is predicatively pre-downloaded to the web client whereby a latency for requesting the second network object is reduced when requested in response to an actual user request.

2. The pre-download device of claim 1 wherein the hint comprises a Uniform Resource Locator (URL) pointing to the second network object.

3. The pre-download device of claim 1 further comprising a policy rules database, separate from the web server, containing policy rules and statistics regarding a set of request pairs for network objects, the request pairs indicating transitions between one network object and another network object.

4. The pre-download device of claim 3 wherein the prediction engine is operatively configured to determine the second network object most probable to be requested in the future from the web server based on a match between a maintained policy rule and the requested first network object, the maintained policy rule comprising request pairs indicating transitions between important network objects.

5. The pre-download device of claim 3 wherein the prediction engine is operatively configured to determine the second network object most probable to be requested in the future from the web server based on a match between statistics and the requested first network object, the statistics comprising a web-side model database of regular expressions constructed in response to prior incoming messages to the pre-download device from several web clients.

6. The pre-download device of claim 5 wherein the prediction engine is operatively configured to utilize a finite state machine to detect whether first network object possibly matches a regular expression in the web-side model database.

7. The pre-download device of claim 3 wherein the maintained policy rules comprise information selected from a group consisting of: information about categories of users, demographic information, and past behavior of specific users at a web site.

8. A reverse-proxy device comprising the pre-download device of claim 1 and wherein the cache primer is operatively configured to cache network objects from the web server for subsequent delivery to the web client.

9. The pre-download device of claim 1 wherein the network is selected from a group consisting of: the Internet, an intranet, an extranet, a virtual private network, and an enterprise network.

10. A system for pre-downloading network objects comprising the pre-download device of claim 1, the web client, the network, and the web server.

11. A system for pre-downloading a network object, comprising:
    a web client;
    a web server operatively coupled to the web client through a network; and
    a network object predictive pre-download device operable on the network logically between the web client and the web server, the pre-download device comprising:
      a prediction engine operatively configured to: (i) intercept a request from the web client to the web server for a first network object, (ii) determine a second network object most probable to be requested in the future from the web server, and (iii) intercept a request from the web client for the second network object; and
      a cache primer operatively configured to: (i) intercept a response to the request from the web server, (ii) send a first message to the web client comprising the response including the first network object and a hint identifying the second network object to be cached by the web client, and (iii) send the second network object to the web client in response to a second message from the web client sent in response to the web client receiving the first message such that the second network object is predicatively pre-downloaded to the web client whereby a latency for requesting the second network object is reduced when requested in response to an actual user request.

12. The system of claim 11 wherein the hint comprises a Uniform Resource Locator (URL) pointing to the second network object.

13. The system of claim 11 wherein the pre-download device further comprises a policy rules database, separate from the web server, containing policy rules and statistics regarding a set of request pairs for network objects, the request pairs indicating transitions between one network object and another network object.

14. The system of claim 13 wherein the prediction engine is operatively configured to determine the second network object most probable to be requested in the future from the web server based on a match between a maintained policy rule and the requested first network object, the maintained policy rule comprising request pairs indicating transitions between important network objects.

15. The system of claim 13 wherein the prediction engine is operatively configured to determine the second network object most probable to be requested in the future from the web server based on a match between statistics and the requested first network object, the statistics comprising a web-side model database of regular expressions constructed in response to prior incoming messages to the pre-download device from several web clients.

16. The system of claim 15 wherein the prediction engine is operatively configured to utilize a finite state machine to detect whether first network object possibly matches a regular expression in the web-side model database.

17. The system of claim 13 wherein the maintained policy rules comprise information selected from a group consisting of: information about categories of users, demographic information, and past behavior of specific users at a web site.

* * * * *